United States Patent
Bronson (10) Patent No.: US 7,088,380 B2
(45) Date of Patent: *Aug. 8, 2006

(54) LABELING APPARATUS AND METHOD FOR DISK STORAGE MEDIA

(75) Inventor: Barry Bronson, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/954,422

(22) Filed: Sep. 29, 2004

(65) Prior Publication Data

US 2005/0046692 A1   Mar. 3, 2005

Related U.S. Application Data

(63) Continuation of application No. 10/663,399, filed on Sep. 15, 2003, now Pat. No. 6,864,907, which is a continuation of application No. 10/044,676, filed on Jan. 11, 2002, now Pat. No. 6,771,297.

(51) Int. Cl.
*B41J 2/435* (2006.01)
*G11B 7/85* (2006.01)

(52) U.S. Cl. .................... 347/224; 369/30.04

(58) Field of Classification Search ............ 369/30.04, 369/30.1, 30.07, 30.46, 30.58, 47.22, 53.39, 369/292, 99–100, 284, 13.24–13.27, 44.39, 369/47.5, 47.52; 347/224–229, 30.04, 30.07, 347/30.58, 30.46, 47.22, 30.1, 292; 430/270.11–270.13
See application file for complete search history.

(56) References Cited

U.S. PATENT DOCUMENTS

| | | | |
|---|---|---|---|
| 5,317,337 A | 5/1994 | Ewaldt | 347/2 |
| 5,518,325 A | 5/1996 | Kahle | 400/70 |
| 5,616,447 A | 4/1997 | Arioka | 430/270.11 |
| 5,967,676 A | 10/1999 | Cutler et al. | 400/70 |
| 6,019,151 A | 2/2000 | Wen et al. | 156/387 |
| 6,020,977 A | 2/2000 | Kim | 358/1.7 |
| 6,074,031 A | 6/2000 | Kahle | 347/4 |
| 6,109,324 A | 8/2000 | Bugner et al. | 156/378 |
| 6,310,838 B1 | 10/2001 | Heemskerk et al. | 369/30.1 |
| 6,501,718 B1 | 12/2002 | Ono et al. | 369/53.2 |
| 6,532,034 B1 | 3/2003 | Hirotsune et al. | 347/229 |
| 6,556,234 B1 * | 4/2003 | Koyama | 347/264 |
| 6,864,907 B1 * | 3/2005 | Bronson | 347/224 |
| 2001/0040867 A1 | 11/2001 | Onodera et al. | 369/292 |
| 2002/0045177 A1 | 4/2002 | Oshima et al. | 435/6 |
| 2002/0048241 A1 | 4/2002 | Kumagai et al. | 369/47.39 |
| 2003/0107959 A1 | 6/2003 | Norton et al. | 369/30.23 |

(Continued)

FOREIGN PATENT DOCUMENTS

JP        9-123606        5/1997

(Continued)

OTHER PUBLICATIONS

"LightScribe Direct Disc Labeling Solidfies Market Leadership", www.lightscribe.com, 2 pages.

(Continued)

*Primary Examiner*—Hai Pham (57) ABSTRACT

A label printer system includes a disk storage medium including a thermally-sensitive layer formed on at least a portion of an upper surface. A rotational drive rotates the disk storage medium and a transverse drive moves a laser substantially transversely with respect to the disk storage medium. A memory includes a symbol set and a label printer driver. A processor uses the label printer driver to control the rotational drive and the transverse drive in order to thermally write the symbol set to the thermally-sensitive layer of the disk storage medium, using the laser.

24 Claims, 4 Drawing Sheets

U.S. PATENT DOCUMENTS

2003/0108708 A1    6/2003    Anderson et al. .......... 428/64.4

FOREIGN PATENT DOCUMENTS

| JP | 9-123607 | 5/1997 |
| JP | 9-265760 | 10/1997 |
| JP | 9-306144 | 11/1997 |
| JP | 10-320963 | 12/1998 |
| JP | 11-003543 | 1/1999 |
| JP | 2000006539 A * | 1/2000 |
| JP | 2000 155989 | 6/2000 |
| JP | 2000-173096 | 6/2000 |
| JP | 2000-173238 | 6/2000 |
| JP | 2002-216396 | 8/2002 |

OTHER PUBLICATIONS

"Who is Currently Licensed?", www.lightscribe.com/whoislicensed, 2 pages.

"Why License LightScribe?", www.lightscribe.com/why, 1 page.

Melissa J. Perenson, "What's Next for LightScribe?", PC World, Jun. 14, 2005, 5 pages.

"Review: Yamaha CRW-F1", www.afterdawn.com.

* cited by examiner

LABELING APPARATUS AND METHOD FOR DISK STORAGE MEDIA

This application is a continuation of application Ser. No. 10/663,399, filed Sep. 15, 2003, now U.S. Pat. No. 6,864,907, herein incorporated by reference, which is a continuation of application Ser. No. 10/044,676, filed Jan. 11, 2002, now U.S. Pat. No. 6,771,297, herein incorporated by reference.

FIELD OF THE INVENTION

The present invention relates generally to labeling for a computer disk storage media, and more particularly to labeling employing a computer disk drive.

BACKGROUND OF THE INVENTION

Increasingly large amounts of information are stored on various types of storage media. The popularity of larger and larger capacity storage media is growing due to increasing computer use. Therefore, many types of large data storage needs exist. Examples of situations where computer users need or desire large storage media are for holding database records, software programs, graphics, audio, video, etc. This increasing demand for digital storage media has resulted in the popularity of optical storage media, such as compact disks (CDs) and digital video disks or digital versatile disks (DVDs).

This need for data storage corresponds with a need for labeling of disk contents. The explosion of user writable optical media, such as writable CDs and the recent emergence of writable DVDs, has resulted in large quantities of user created disks.

In the prior art there are several approaches to disk labeling. The first and simplest prior art labeling approach is marking on the disk with a pen or marker. However, while being simple and fast, it has several drawbacks. It could damage the disk and it may increase the likelihood of read errors during use of the disk. In addition, the hand marking approach cannot record detailed or large amounts of information, is not as visually pleasing, generally does not allow for graphics, and may smudge and degrade over time.

A second approach to labeling is an adhesive label that may be independently created and stuck to the disk. The drawbacks of this approach is that extra effort is required by the person making such a label. Moreover, the creation of the label may be easily put off and forgotten because it may require too much effort to always be done at the time of disk creation recording. Moreover, it requires extra effort if additional information is later recorded onto the disk.

A third approach is a digital label approach wherein digital data is internally stored as part of the information on the disk and not on an external label. This may allow permanent marking and may allow for larger quantities of data. However, the drawbacks are that a person or user cannot visually read the label and must insert the disk into a disk drive to read the label.

A fourth approach is an approach illustrated in U.S. Pat. No. 6,074,031 to Kahle, wherein a bubble jet or inkjet label printer is built into a disk drive. Although this allows a user to put large quantities of data on the label and allows it to be printed In a professional and neat manner, there are still several drawbacks. One drawback is that it is expensive. This prior art approach adds to the cost of a disk drive and requires frequent re-supply of materials such as ink or ink cartridges. Furthermore, it will increase the size of the disk drive. Another drawback is that the ink from the label printer may get into the drive mechanism and may foul the read and writing lasers of the disk drive. Yet another drawback is a recurring effort of maintaining and resupplying ink to the label printer. Yet another drawback is that heat in the drive mechanism may dry out the ink.

Therefore, there remains a need in the art for improvements to computer disk media labeling.

SUMMARY OF THE INVENTION

A label printer system comprises a disk storage medium including a thermally-sensitive layer formed on at least a portion of an upper surface. A rotational drive rotates the disk storage medium and a transverse drive moves a laser substantially transversely with respect to the disk storage medium. A memory includes a symbol set and a label printer driver. A processor uses the label printer driver to control the rotational drive and the transverse drive in order to thermally write the symbol set to the thermally-sensitive layer of the disk storage medium, using the laser.

DETAILED DESCRIPTION

Figure 1:
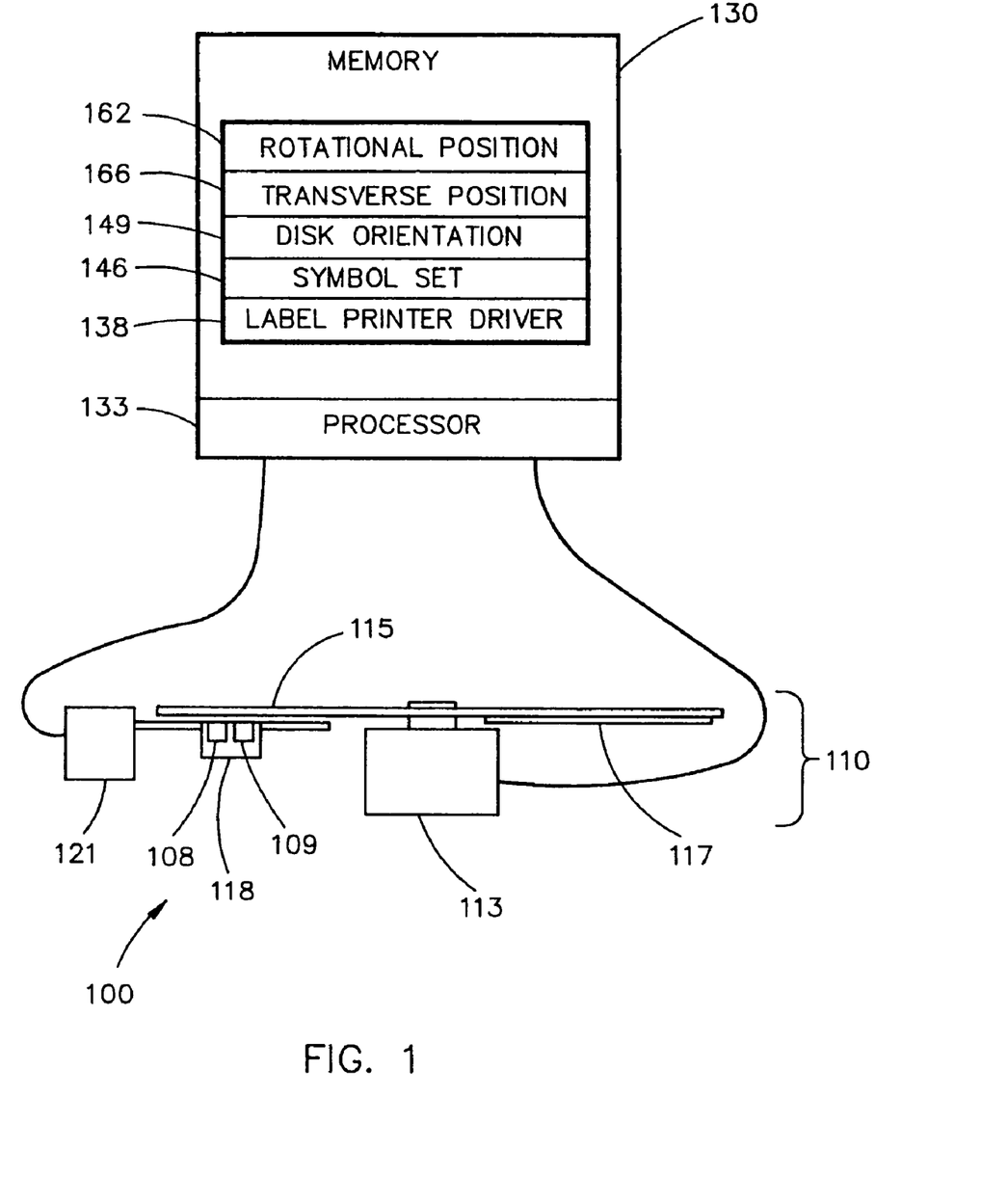
FIG. 1 is a schematic of a label printer system according to one embodiment of the invention.

FIG. 1 is a schematic of a label printer system 100 according to one embodiment of the invention. The label printer system 100 includes a disk drive 110, a processor 133, and a memory 130. The disk drive 110 includes a rotational drive 113 capable of controlling the rotation of a disk storage medium 115, such as a CD or DVD disk, for example. The disk drive 110 further includes a transverse drive 121 capable of controlling a transverse motion of the laser head 118 toward the center of the disk storage medium 115. The disk drive 110 further includes a laser head 118, including at least a writing laser 109 for reading from and writing to the disk storage medium 115. The laser head 118 may alternatively include both a read laser 108 and a writing laser 109.

The processor 133 may be any type of general purpose processor capable of controlling the rotational drive 113 and the transverse drive 121 for normal disk read and write operations. In addition, the processor 133 is capable of controlling the rotational drive 113, the transverse drive 121, and the laser head 118 for a label printing operation.

The memory 130 may be any type of digital memory. The memory 130 may store, among other things, a disk orientation variable 149, a symbol set 146, a label printer driver 138, a disk rotational position 162, and a transverse position 166. In addition, the memory 130 may store software or firmware to be executed by the processor 133.

The processor 133 and memory 130 may comprise a specially programmed disk controller that is part of the disk drive 110. Alternatively, the processor 133 and the memory 130 may be part of a personal computer or work station (not shown), and may perform additional control of the disk drive 110.

The disk storage medium 115 may be any type of disk medium wherein a rotational and transverse drive are used to read and write data from the disk storage medium 115. This may include a CD disk, a DVD disk, etc.

The disk storage medium 115 includes a thermally-sensitive layer 117 that changes color when heated. The heating is accomplished by a writing laser. The color change may be used in order to form alpha-numeric characters, graphics, etc. The thermally-sensitive layer 117 may change to a black color when heated, for example. Alternatively, the thermally-sensitive layer 117 may change to other colors, as desired.

The thermally-sensitive layer 117 may be a layer deposited on the disk storage medium 115 or may be a label that is attached by an adhesive. The label may further be a permanent or peel-off label. In the case of a peel-off label, this would allow the user to later remove the label if the user significantly changed the contents of the disk storage medium 115.

The laser head 118 may include a read laser 108 and a writing laser 109, as is known in the art. The read laser 108 is generally a low power laser that cannot change the information bits on the disk storage medium 115, but is merely capable of detecting a state of an information bit. The writing laser 109 is of a higher power and can focus enough light energy on the disk storage medium 115 to change the state of information bits therein. Alternatively, a single writing laser 109 may be included and may be modulated to a lower power level. At a lower power level, the single writing laser 109 may also be employed as a read laser.

The rotational drive 113 is capable of rotating the disk storage medium 115. The rotational drive 113 may be any suitable drive mechanism, including all manner of electric motors, geared electric motors, servo motors, stepper motors, etc.

The transverse drive 121 is capable of moving the laser head 118 transversely with respect to the disk storage medium 115. The motion may be approximately linear, or may be approximately arcuate. The laser head 118 alternatively may pivot with respect to the disk storage medium 115, such as in a computer hard drive. The transverse drive 121 may be any suitable drive mechanism, including all manner of electric motor and worm gear combinations, servo motors, stepper motors, etc.

The disk orientation variable 149 may indicate whether the disk storage medium 115 is in the disk drive 110 in an upright or inverted position. As will be discussed below, the laser head 118 may include merely the read laser 108 and the writing laser 109, as is known in the art. Because the disk drive 110 in this embodiment includes only a conventional read laser 108 and writing laser 109, the disk storage medium 115 will need to be inserted into the disk drive 110 in an inverted position, with a top surface of the disk storage medium 115 facing downward. As a result, the standard writing laser 109 of the disk drive 100 is positioned underneath the disk storage medium 115 and can be trained on the thermally-sensitive layer 117.

The symbol set 146 stores one or more alpha-numeric characters, images, icons, graphics, etc. The symbol set 146 therefore stores any symbol capable of being digitally represented and printed on the label of the disk storage medium 115.

The label printer driver 138 is a software routine that interprets the symbol set 146 and converts it into a set of rotational and transverse movements and writing laser activations. The label printer driver 138 therefore enables the control of the rotational drive 113 and the transverse drive 121 in order to write the symbol set onto the thermally-sensitive layer 117 of the disk storage medium 115. The label printer driver 138 therefore may be a software driver that Is loaded in order to operate the label printer function of the disk drive 110.

The disk rotational position 162 stores a current rotational position of the disk. The disk rotational position 162 may be used to track and control a rotational motion of the rotational drive 113.

The transverse position 166 stores the transverse displacement of the laser head 118. The transverse displacement is the motion of the laser head 118 toward or away from a central hub of the disk storage medium 115, in an approximately linear or arcuate path. The transverse position 166 may be used to track and control the transverse motion of the laser head 118.

In operation, the user inserts a disk storage medium 115 into the disk drive 110 in an inverted orientation. This inverted orientation will be reflected in the disk orientation variable 149. The thermally-sensitive layer 117 is therefore on the lower side of the disk storage medium 115, and is capable of being written to by the laser head 118. The processor 133 executes the label printer driver 138 and reads the data in the symbol set 146. Using the rotational position variable 162 and the transverse position variable 166, the processor 133 controls the rotational drive 113 and the transverse drive 121 in order to manipulate the laser head 118 with respect to the disk storage medium 115. The processor 133 therefore controls the disk drive 110 in order to train the writing laser 109 on the disk storage medium 115 in the patterns dictated by the symbol set 146, thereby writing label symbols to the disk storage medium 115. The thermally-sensitive layer 117 therefore may be heated in order to create any manner of alphanumeric symbols and/or graphics.

Figure 2:
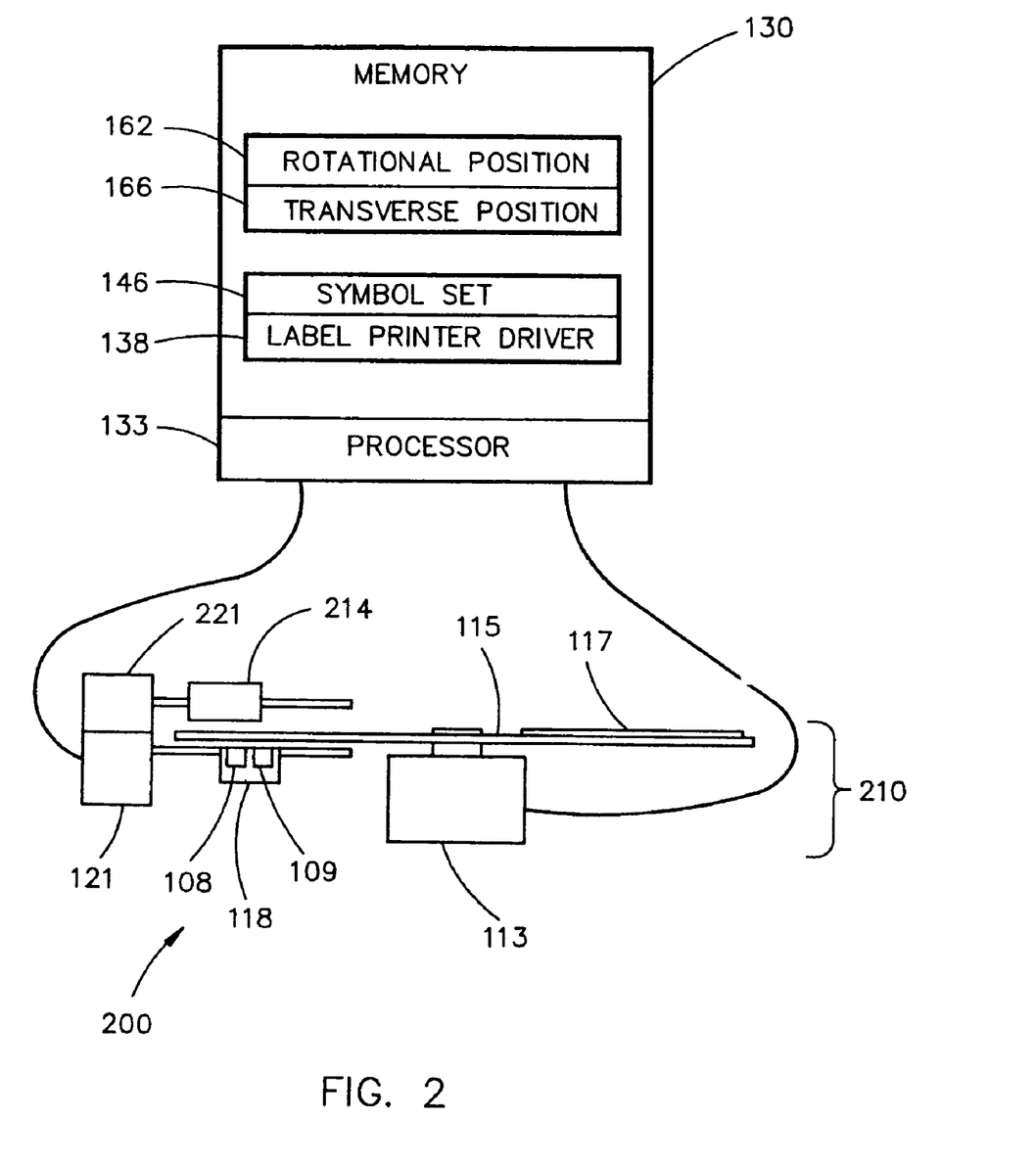
FIG. 2 is a schematic of a label printer system according to another embodiment of the invention.

FIG. 2 is a schematic of a label printer system 200 according to another embodiment of the invention. In this second embodiment, a disk drive 210 further includes a label printer writing device 214. All components in common with the first embodiment 100 share the same reference numerals.

The label printer writing device 214 may be any manner of heat producing element capable of writing to the thermally sensitive layer 117. For example, in one embodiment the label printer writing device 214 may be a laser, including a laser diode. Alternatively, in another embodiment the label printer writing device 214 may be a thermal writing head, such as a facsimile writing head, that includes one or more thermal devices.

The label printer writing device 214 is positioned above the disk storage medium 115, and as a result the disk storage medium 115 may be inserted in a normal, upright orientation. As a consequence, the disk drive 210 may write digital data to the disk storage medium 115 (using the laser head 118) while concurrently or independently writing to a label on the upper side of the disk storage medium 115 (using the label printer writing device 214).

It should be noted that the label printer writing device 214 may move concurrently with the laser head 118 (i.e., it may be moved by the transverse drive 121). Alternatively, a second transverse drive 221 may move the label printer writing device 214 independently of the laser head 118. If a screw-type drive moves the label printer writing device 214, it may be desirable to rotate the screw with respect to the second transverse drive 221 in order to retract the label printer writing device 214 (for purposes of insertion and removal of the disk storage medium 115).

Figure 3:
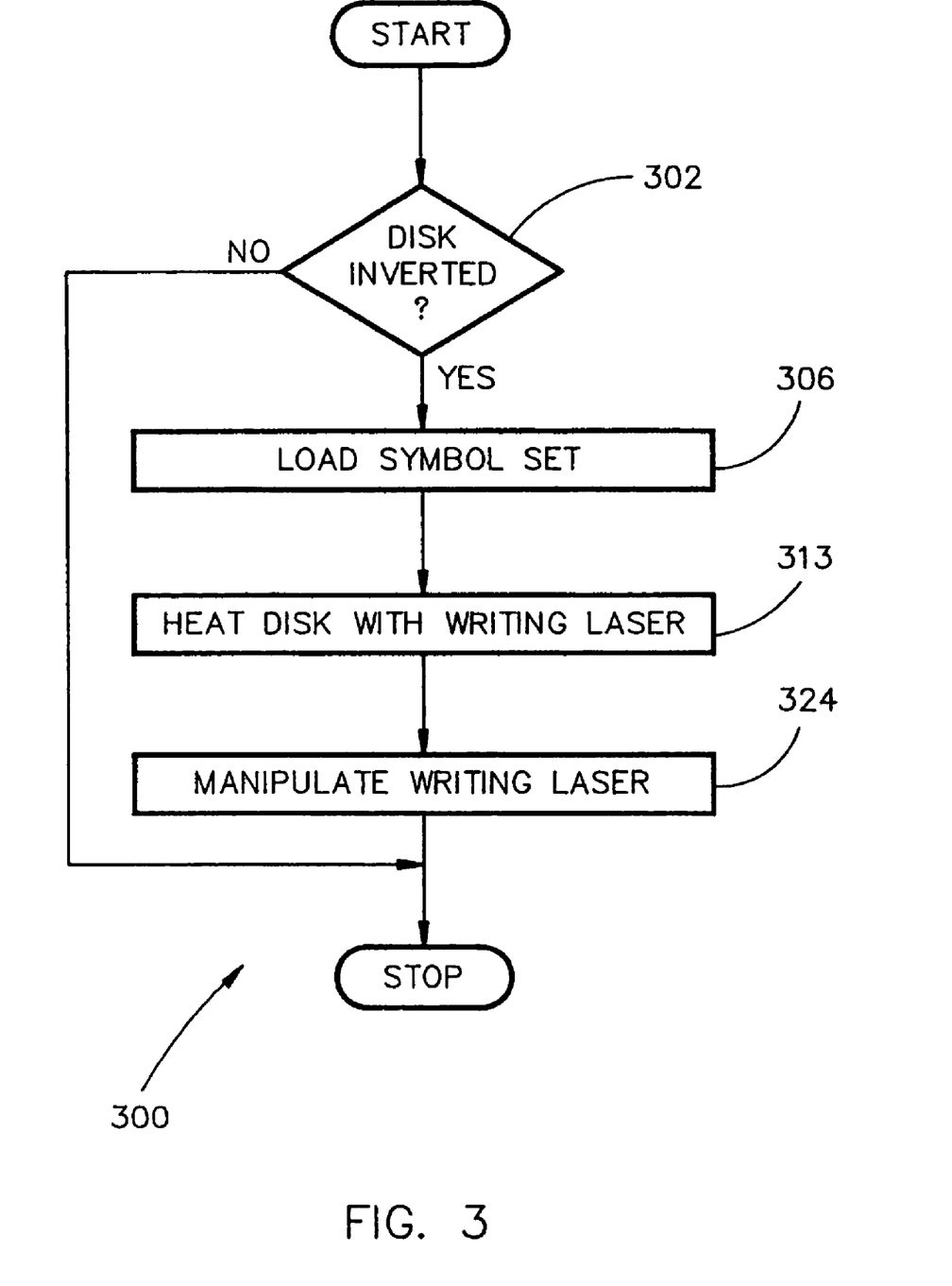
FIG. 3 is a flowchart of a label printing method according to one embodiment of the invention.

FIG. 3 is a flowchart 300 of a label printing method according to one embodiment of the invention. In step 302, the method detects whether the disk storage medium 115 is inverted. This is an optional step that may be performed if there is only a single writing laser 109 positioned below the disk storage medium 115. Such a configuration necessitates inversion of the disk storage medium 115 for a label printing operation. If the disk drive includes a label printer writing device 214 positioned above the disk storage medium 115, this step is not needed. If the disk is inverted, then the method proceeds onto step 306; otherwise, it exits.

In step 306, a symbol set 146 is loaded. The symbol set 146 is a digital data contents of a desired label, as dictated by a user of the disk drive 110 or 210. The symbol set 146 may be programmed into the computer memory 130 by the user, and may be transferred onto the thermally-sensitive layer 117 of the disk storage medium 115 as part of the label printing process. For example, the symbol set 146 may include a disk name, a description of disk contents, a date, etc., and may further include any manner of graphics.

In step 313, a spot or spots on the disk storage medium 115 are heated with the laser head 118 or label printer writing device 214. The spot or spots are heated to activate the thermally-sensitive layer 117 at the spot or spots where the laser head 118 or label printer writing device 214 is currently trained.

In step 324, the laser head 118 or label printer writing device 214 is manipulated with regard to the disk storage medium 115. This may include transversely moving the laser head 118 or label printer writing device 214, rotating the disk storage medium 115, or both. This is done to form a set of symbols as dictated by the symbol set 146. The manipulation therefore moves the laser illumination spot. In this manner, the laser head 118 or label printer writing device 214 may form any manner of symbols and may form them on any area of the disk storage medium 115 that is covered by the thermally-sensitive layer 117.

The label printer according to the invention allows the user to add to a label if a disk is reinserted. To add to an existing label, the label printer according to the invention will need to detect an existing label and detect an open or empty area on the thermally-sensitive layer 117. The label printer may further perform an erasing operation if the provided disk storage medium includes an erasing capability.

In an additional capability, the method may be used for color printing. The color printing may be done in any of several ways. In one embodiment, the thermally-sensitive, layer 117 includes multiple layers and the laser head 118 or label printer writing device 214 may be modulated to burn through the appropriate layers to produce a desired color. In another embodiment, the thermally-sensitive layer 117 may be arranged in a pattern, wherein the symbol set 146 may dictate which pattern areas are to be thermally activated in order to form a label composed of different colors. The pattern could be a series of substantially concentric rings of different colors, may be a substantially radial line pattern, may be substantially a grid, etc.

One additional requirement of the color printing is the need for precise positional information of the color pattern for precise positioning of a writing laser with regard to the pattern. This may be done through one or more alignment marks or an alignment pattern, may be done through a pre-reading of thermally sensitive layers, may be done through a test printing on a small area of the thermally-sensitive layer 117, such as near the hub, near the edge of the disk storage medium 115, etc. Any test printing area may later be burned to black in order to obliterate such a test area.

Figure 4:
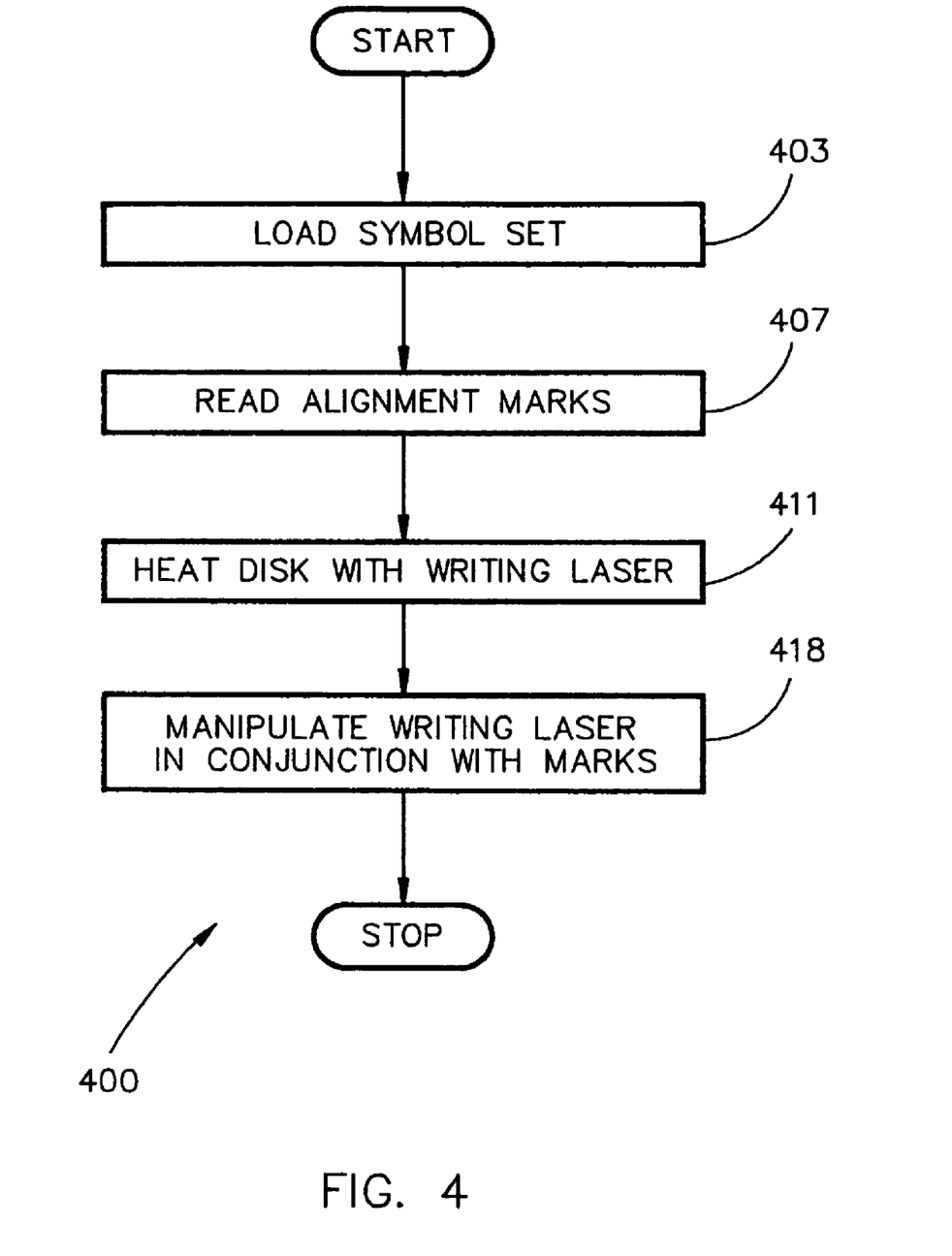
FIG. 4 is a flowchart of a label printing method according to another embodiment of the invention.

FIG. 4 is a flowchart 400 of a label printing method according to another embodiment of the invention. In step 403, a symbol set 146 is loaded, as previously discussed.

In step 407, one or more alignment marks on the disk storage medium 115 are read. The alignment marks may be pre-printed on the thermally-sensitive layer 117. The reading of the alignment marks may be done by the standard read laser 108 of the laser head 118. The alignment determination may be used in order to properly align a completed label according to a predetermined orientation, and may be especially applicable to color label printing. Alternatively, the alignment marks could be printed on the thermally-sensitive layer 117 before the label printing procedure commences and as part of the label printing procedure. In another alternative, the data tracks on the disk storage medium 115 may be used for alignment. For example, file headers of the stored digital data may be used for alignment.

In step 411, a spot on the disk storage medium 115 is heated with the laser head 118 or label printer writing device 214, as previously discussed.

In step 418, the laser head 118 or label printer writing device 214 is manipulated with regard to the disk storage medium 115 and the alignment marks. As before, the manipulating is done by the rotational drive 113 and the transverse drive 121 or 221, but is also done in conjunction with the detected alignment marks in order to position the symbols to be printed (and optionally in order to print color).

It should be noted that the finished label may include embedded information, including information about the disk storage medium 115. This embedded disk information may include information such as disk type, disk capacity, thermal media printing characteristics, locations of alignment marks, licensing information, etc. In addition, the label may come with pre-recorded data, such as a color layer pattern, a thermal sensitivity (i.e., how much laser power will be needed to activate the thermally sensitive layer); gray scale information such as a gray scale gamma curve; etc.

In addition, the disk drive 110 may be capable of learning a color pattern formed in the thermally sensitive layer, such as a self-calibration wherein test marks are written on a small area of the label in order to determine the color pattern. It should be understood that in this embodiment the disk drive 110 must include an optical detector element that reads the thermally sensitive layer 117. Any test marks may later be written to black in order to remove any undesired marks on the thermally sensitive layer 117.

The alignment marks may be detected by the standard read laser 108. Alternatively, in the embodiment of the disk drive 210 that includes two writing lasers, alignment marks could use a data side disk for alignment. Therefore, the standard read laser could look at a first readable data header and use that as an alignment mark for the label printing operation.

Another use of the alignment marks is for an eject operation. The alignment marks may be used to eject the disk storage medium 115 according to a predetermined orientation. As a result, the label may be oriented so as to be normally viewed and read by the user when ejected.

The data written to the thermally sensitive layer 117 may also be used for subsequent label writing operations. For example, in one embodiment the data written to the thermally sensitive layer 117 may be also stored to a label data file. The label data file may be stored on the user's computer, on an associated computer network, or even on the corresponding disk. When a particular disk is re-inserted, such as for adding to the stored digital data, the label printer may identify the particular disk, may retrieve the label data file, and may even bring up an image of the current label. The user may therefore modify the existing label corresponding to the changes to the digital data contents of the disk. Therefore, if the disk is a music CD and the user desires to add additional songs to the disk, for example, the user may also add the songs to the label. This allows the user to modify and even preview the label data. In addition, the label printer may warn the user if there is not enough space on the label to add desired new material. Furthermore, if the label data file can not be found, in one embodiment the label printer may optically scan the label and reconstruct the label data file.

The invention differs from the prior art in that the invention uses a thermally-sensitive layer that may be activated by a writing laser of the disk drive. The label may be integral with the disk and can be burned in before or after a disk data writing operation. In addition, a label according to the invention may be written to more than one time. Furthermore, the label can be a separate label that is adhered to the disk storage medium 115 before the label printing operation. Consequently, the user may add the label to a previously written-to disk or may adhere more than one label to a particular disk.

The label printing according to the invention provides several benefits. The label printing provides easy printing of a label on any disk storage medium and is capable of printing a high quality label that can accommodate any combination of text or graphics. The label printing according to the invention requires only a few or no extra steps, and can use an existing writing laser of a disk drive. There is no ink or toner used in the disk drive to create maintenance problems. There is no ink or toner to smudge, no required ink or toner supply or replacement, and no additional maintenance load will be placed on the disk drive. Therefore, there is no need to independently track supplies, as the printable medium may be purchased on individual disks. In addition, the label printing according to the invention may be used to create color labels and designs.

Another benefit according to the invention is that the label printed in the invention may be used to retrofit and reconfigure an existing disk drive with a new software routine in order to enable label printing according to the invention.

In an additional benefit, the user may be able to digitally create label information and download it and print it onto the disk storage medium 115 as part of the normal digital data writing to the data side of the disk storage medium 115. Therefore, the label printing could be done automatically and all the user has to do is specify the label information.

The invention claimed is:

1. A label printer system for a disk storage medium including a thermally-sensitive layer and embedded disk information with pre-recorded data formed on at least a portion of a surface of said disk storage medium, the label printer system comprising;
    a rotational drive for rotating said disk storage medium;
    a transverse drive including a laser head for moving a laser substantially transversely with respect to said disk storage medium;
    a memory including a symbol set and a label printer driver; and
    a processor communicating with said memory, said rotational drive, said transverse drive, and said laser, and wherein said processor uses said label printer driver to control said rotational drive and said transverse drive in order to thermally write said symbol set to said thermally-sensitive layer of said disk storage medium using said laser at a laser power read from the pre-recorded data with the laser.

2. The system of claim 1, wherein said memory further includes a rotational position variable that tracks a rotational position of said disk storage medium.

3. The system of claim 1, wherein said memory further includes a transverse position variable that tracks a transverse position of said laser head.

4. The system of claim 1, wherein said memory further includes a disk orientation variable that tracks an orientation of said disk storage medium.

5. The system of claim 1, wherein said laser head comprises a read laser and a writing laser positioned below said disk storage medium, with said writing laser being used to thermally write to said thermally-sensitive layer.

6. The system of claim 1, wherein said laser head comprises a read laser and a writing laser positioned above said disk storage medium and further comprises an additional read laser positioned below said disk storage medium, with said writing laser being used to thermally write to said thermally-sensitive layer.

7. A label printing method for a disk storage medium having embedded information with pre-recorded data, comprising the steps of:
    loading a symbol set to a processor controlling a disk drive, with said symbol set including one or more predetermined symbols or graphics to be written to said disk storage medium;
    reading the pre-recorded data from the disk storage medium;
    heating with a laser, using the pre-recorded data to control power to the laser, a thermally-sensitive layer formed on at least a portion of an upper surface of said disk storage medium; and
    manipulating said laser with respect to said disk storage medium;
    wherein said symbol set is used to controls the manipulating step in order to write said one or more predetermined symbols or graphics to said thermally-sensitive layer.

8. The method of claim 7, wherein said disk drive includes a read laser and a writing laser positioned below said disk storage medium and a label printer writing device positioned above said disk storage medium, and wherein the heating step is performed by said label printer writing device.

9. The method of claim 7, further comprising the steps of:
    rotating said disk storage medium;
    transversely moving said laser with respect to said disk storage medium;
    tracking a rotational position of said disk storage medium in a rotational position variable; and
    tracking a transverse position of said laser in a transverse position variable;
    wherein said rotational position and said transverse position are used by said processor for manipulating said laser with respect to said disk storage medium.

10. The method of claim 7, further comprising the step of reading one or more alignment marks on said disk storage medium.

11. A label printing method for a disk storage is medium, comprising the steps of:
    loading a symbol set to a processor controlling a disk drive, with said symbol set including one or more predetermined symbols or graphics to be written to said disk storage medium;

reading one or more types of embedded information of pre-recorded data on said disk storage medium;

heating with a laser a thermally-sensitive layer formed on at least a portion of an upper surface of said disk storage medium; and manipulating said laser with respect to said disk storage medium;

wherein said symbol set in conjunction with said one or more types of embedded information of pre-recorded data is used to controls the manipulating step in order to write said one or more predetermined symbols or graphics to said thermally-sensitive layer.

12. The method of claim 11, wherein said one or more types of embedded information of pre-recorded data are used to determine the location of one or more alignment marks which are used to align a completed label according to a predetermined orientation.

13. The method of claim 12, wherein said one or more alignment marks are pre-printed on said thermally-sensitive layer.

14. The method of claim 12, wherein said one or more alignment marks were previously written to a data contents of said disk storage medium.

15. The method of claim 11, wherein said laser comprises a label printer writing device positioned above said disk storage medium, and wherein the heating step is performed by said label printer writing device.

16. The method of claim 11, further comprising the steps of:

rotating said disk storage medium;

transversely moving said laser with respect to said disk storage medium;

tracking a rotational position of said disk storage medium in a rotational position variable; and tracking a transverse position of said laser in a transverse position variable;

wherein said rotational position and said transverse position are used by said processor for manipulating said laser with respect to said disk storage medium.

17. A label printing method for a disk storage medium having embedded information with pre-recorded data, comprising the steps of:

loading a symbol set to a processor controlling a disk drive, with said symbol set including one or more predetermined symbols or graphics to be written to said disk storage medium;

reading one or more-alignment marks on said disk storage medium;

heating with a laser a thermally-sensitive layer formed on at least a portion of an upper surface of said disk storage medium at a laser power read from the pre-recorded data with the laser; and manipulating said laser with respect to said disk storage medium;

wherein said symbol set in conjunction with said one or more alignment marks used to control the manipulating step in order to write said one or more predetermined symbols or graphics to said thermally-sensitive layer; and wherein said one or more alignment marks were previously written to a data contents of said disk storage medium.

18. A labeling apparatus for disk storage medium having a thermally sensitive layer, one or more alignment marks, and embedded disk information with pre-recorded data, comprising:

means for reading the pre-recorded data from the disk storage medium;

means for heating on the thermally sensitive layer in conjunction with the pre-recorded data; and means for manipulating said means for heating with respect to said disk storage medium in order to write on or more predetermined symbols or graphics to said thermally-sensitive layer in conjunction with the one or more alignment marks.

19. The labeling apparatus of claim 18 wherein said means for heating is a laser.

20. The labeling apparatus of claim 18 wherein said means for heating is a thermal writing head.

21. The labeling apparatus of claim 18, further comprising:

means for detecting existing symbols or graphics; and means for detecting an empty area on the thermally sensitive layer.

22. The labeling apparatus of claim 21, further comprising:

means for allowing a user to view the existing symbols or graphics; and means for allowing the user to modify the existing symbols or graphics.

23. The labeling apparatus of claim 18, wherein said means for manipulating includes means for forming a label composed of different colors disposed in a pattern within the thermally sensitive layer.

24. The labeling apparatus of claim 18, further comprising means for storing a label data file within the thermally sensitive layer.

* * * * *